(12) United States Patent
Johnson

(10) Patent No.: US 8,114,321 B2
(45) Date of Patent: Feb. 14, 2012

(54) METHOD AND APPARATUS FOR THERMALLY CONTROLLING A MOLD, DIE, OR INJECTION BARREL

(75) Inventor: Kenneth E. Johnson, Hollis, NH (US)

(73) Assignee: MoldCool International, LLC, Bow, NH (US)

( * ) Notice: Subject to any disclaimer, the term of this patent is extended or adjusted under 35 U.S.C. 154(b) by 1169 days.

(21) Appl. No.: 11/352,894

(22) Filed: Feb. 13, 2006

(65) Prior Publication Data
US 2006/0196957 A1 Sep. 7, 2006

(51) Int. Cl.
*B29C 47/92* (2006.01)
(52) U.S. Cl. ............ 264/40.6; 264/328.14; 264/328.16; 264/519; 165/263; 165/293; 236/46 F; 236/78 D; 62/185; 62/201; 700/202
(58) Field of Classification Search .................. 264/40.6, 264/519, 328.16, 328.14; 165/263, 293; 236/46 F, 78 D; 62/185, 201; 700/202
See application file for complete search history.

(56) References Cited

U.S. PATENT DOCUMENTS

| | | | |
|---|---|---|---|
| 3,905,312 A | 9/1975 | Nichols | |
| 4,278,230 A | 7/1981 | Allen | |
| 4,318,874 A | 3/1982 | Lemelson | |
| 4,354,812 A | 10/1982 | Wieder et al. | |
| 4,367,785 A | 1/1983 | Allen | |
| 4,420,446 A | 12/1983 | Wieder et al. | |
| 4,680,001 A | 7/1987 | Waters | |
| 4,768,484 A | 9/1988 | Scarselletta | |
| 4,902,454 A | 2/1990 | Steinbichler et al. | |
| 4,936,312 A | 6/1990 | Tsukagoshi | |
| 5,026,171 A * | 6/1991 | Feller | ............ 374/41 |
| 5,047,605 A * | 9/1991 | Ogden | ............ 219/633 |
| 5,376,317 A | 12/1994 | Maus et al. | |
| 5,427,720 A | 6/1995 | Kotzab | |
| 5,452,999 A | 9/1995 | Evans | |
| 5,589,114 A | 12/1996 | Evans | |
| 5,620,715 A * | 4/1997 | Hart et al. | ............ 425/143 |
| 5,720,912 A | 2/1998 | Liehr et al. | |
| 5,772,933 A | 6/1998 | Kotzab | |
| 6,312,628 B1 | 11/2001 | Wieder et al. | |
| 6,522,994 B1 * | 2/2003 | Lang | ............ 702/183 |

(Continued)

FOREIGN PATENT DOCUMENTS

GB 2113315 A 8/1983
(Continued)

OTHER PUBLICATIONS

Cenegel, Thermodynamics, 1998, The McGraw Hill Company Inc, Third Edition, see p. 196.*

(Continued)

*Primary Examiner* — Frantz Jules
*Assistant Examiner* — Azim Rahim
(74) *Attorney, Agent, or Firm* — Vern Maine & Associates

(57) ABSTRACT

A method and apparatus are disclosed for managing thermal energy transfer between a mold, die or cavity and a thermal transfer fluid. The thermal energy being exchanged with the mold, die or cavity is calculated in real time as a function of the temperature differential between inlet and outlet fluid temperatures, the volumetric rate of fluid delivery, and known characteristics of the fluid. The rate of thermal energy exchange is controlled by varying the fluid delivery rate in accordance with a desired thermal energy exchange profile.

14 Claims, 5 Drawing Sheets

U.S. PATENT DOCUMENTS 6,609,038 B1 8/2003 Croswell et al.
2004/0264125 A1* 12/2004 Cheng et al. .................. 361/687

FOREIGN PATENT DOCUMENTS

GB 2156445 A 10/1985
JP 58120162 7/1983

OTHER PUBLICATIONS

PCT Search Report dated Nov. 20, 2007 of Patent Application No. PCT/US07/62023 filed Feb. 13, 2007.
Reploglas Corporation, 90smart Temperature contol unit for watrer up to 195 degF, Brochure, 2 pages, St. Joseph, MI.
Mokon, Duratherm Circulating Water Temperature Control System, Brochure, 2 pages, Buffalo, NY.
AEC, TrueTemp Series (TDV1NX) Water Temperature Control Units, Technical Specifications, 4 pages, Wood Dale, IL.
Single, Alternating Temperature Technology ATT series, Brochure, 4 pages, Hochdorf, Germany.
Frigel, Microgel and Turbogel High Performance Cooling for Your Process, Brochure, 6 pages, Scandicci, Italy.
Thermal Care, Temperature Controllers, Brochure, 12 pages, Niles, IL.
Wittmann Kunststoffgerate GmbH, TEMPRO Mold Temperature Controllers, Brochure, 8 pages, Vienna, Austria.
The Conair Group, Inc., Thermolator TW Water Temperature Control Unit, User Guide, 78 pages, Pittsburgh, PA.
AEC, Trutemp TCU Series Water TCUS Heat and Cool, Brochure, 6 pages.

* cited by examiner

METHOD AND APPARATUS FOR THERMALLY CONTROLLING A MOLD, DIE, OR INJECTION BARREL

FIELD OF THE INVENTION

The invention relates to thermal control systems and methods for exerting thermal control, and more particularly, to thermal control systems and methods for use with an injection molding apparatus.

BACKGROUND OF THE INVENTION

A thermal fluid circulator in the context of the invention is a device or system that is commonly used in the plastics, metals, ceramics, and die cast molding industries in the control of operating temperatures of molds, dies or injection barrels. Circulator systems may incorporate a built-in chiller. Central chilling systems need a main circulator pumping system. Alternatively, they are also built using water tower evaporative cooling technology. Circulators are also used in other industries besides plastics for similar temperature control purposes. Sometimes circulators are used for controlling the operating temperatures in a two component mixing process such as molding liquid silicone rubber or LSR and sometimes called LIM, which is exothermic process where heat is given off when the polymer chains are cross linking. This type of process requires precise temperature control of a specially designed injection barrel which keeps the two part mixture from chemically setting up prematurely.

The circulator is sometimes called a "temperature control unit", and may be called a "water circulator." Some circulator units use oil as the thermal fluid medium and are called "oil circulators." Oil circulators are primarily used to heat, not cool the mold. Water circulators can circulate water over a wide range of temperatures depending on system pressure. Under higher than ambient pressures, water-based systems can be used for heating to 300° F. to 500° F., and are commonly used where heat is desired instead of cooling for the molding of thermoset plastics or just high temperature plastics.

These "circulators" come in two basic schemes. One type of system is called "direct injection" and the other is called "closed loop." "Direct injection" and "closed loop" describe how the fluid that is directed from the fluid pump to the mold, die or barrel, is returned to the main circulation system after absorbing or shedding thermal energy from the molding process.

The amount of energy absorbed or shed by the thermal fluid depends on several variables including the mold details, the process details, and the thermal fluid temperature control (circulator) system details. With regard to the mold, for example, variables may include the thermal conductivity of the material of which the mold, die or barrel is fabricated, the volume (mass) of the mold, amount of surface exposure to localized and/or total ambient air temperatures and to other incidental or purposeful environmental heating and cooling influences affecting the mold. With regard to the process, variables include its location and concentration within the mold, range of variation or curve of thermal demand or excess over a cycle of operation, duration of the thermal cycle, and dwell time between cycles. With respect to the temperature control (circulator) system, relevant variables include the proximity of the process within the mold to the network of thermal fluid channels, the absolute and average temperature differential of the fluid and the process; the absolute and average rate of BTU transfer required to sustain a repetitive or continuous process, the thermal conductivity and capacity of the thermal fluid, the volume and surface area of the fluid channels within the mold, and the time of exposure and flow rate of the fluid within the mold. The temperature control (circulator) system must have the capacity to sense the thermal requirement, and to supply and control a sufficient quantity of thermal transfer fluid at the right temperature and rate to satisfy the requirement.

Using an example of a water type circulator being used to control the temperature of a plastics injection mold; the direct injection technique directly adds cooled water and extracts heated water to and from the "loop of water" circulating between the pump and the mold in order to control the loop of water temperature and thus in turn the temperature of the mold. In this example, mold or process temperature is controlled, at least in part, by measuring and comparing the temperature of the water returning from the mold against a set point to obtain the temperature rise. The addition of cool water is used to maintain the control loop temperature to a desired set point.

In an alternative technique called "closed loop," the "loop of water" or fluid circulation path passes through a water to water heat exchanger to remove the excess heat picked up from the molding process. Coolant is cycled on and off to the heat exchanger to control the control loop temperature.

Irregardless of which scheme is used, the primary method for generating the fluid flow in the current technology conventional circulator is to use a standard, fixed speed electric motor mated to a centrifugal pump. With a conventional centrifugal pump circulator there is no means of controlling the pump pressure during molding operations. The temperature control of the loop water or fluid is the only control mechanism available for dynamic control of the mold temperature. While this form of process temperature control is simple and adequate for many purposes, it lacks consideration and control of other variables affecting the cooling dynamic. Voltage variations and slippage in the centrifugal pump affect the rate and volumetric throughput of thermal fluid in the mold, and ultimately reduce the precision of process temperature control.

Additionally, fluctuations in the supply voltage to the motor will likely affect motor speed and system pressure, altering the balance of variables in the cooling dynamics. These pressure fluctuations affect the rate of flow and the precision of process control. This results in a less than optimal design for a circulator system, and does not yield efficient and precise control of the mold temperature. Neither "direct injection" nor "closed loop" modes of circulators using conventional fixed speed/centrifugal pump systems can offer programmable flow schemes controlling more than fluid temperature.

In the field of plastics molding, die casting, metal molding, and ceramic molding there are temperature controllers that use intermittent or pulsed flow techniques. This method for controlling mold die or barrel temperatures is commonly called pulsed cooling or pulsed tempering in the trades. In pulsed cooling schemes the flow is metered in an intermittent on/off method using valves. The "on" duration is lengthened or shortened to compensate for changes in supply pressure and of mold, die or injection barrel temperature. This requires a temperature sensor in the mold to sense the temperature fluctuations in the process fluctuations, rather than the water loop sensor described previously. Pulsed flow techniques have been disclosed by others, such as in basic injection molding practice, how a controller advances the mold cooling control technology through the use of turning valves on and off or as it is called in the trades, "pulsed cooling" or "pulse tempering". These control systems accomplish their control though the use of a valve that is opened or closed. The controller has a means of measuring the either mold steel temperature, the overall cycle time, or the exit water temperature with appropriate sensors, to determine how often the valve needs to be pulsed on during the injection cycle to maintain a target temperature set point.

What is needed, therefore, are improved systems and techniques for process temperature control in an injection molding process.

SUMMARY OF THE INVENTION

The prior art provides several techniques for restoring the return line temperature or post process temperature to a supply line temperature or temperature that will provide a surplus of heating or cooling capacity to the control loop and hence to the molding machine. However, the effectiveness of these techniques varies considerably based on system design, component selection, and overall operating conditions, as described in the background section, all of which limits the precision and reliability of the temperature control process. It is the ability to control the volume of fluid being inserted into the temperature control system, in real time or near real time, in the manner of the invention, shifting the basis of control to the precision delivery of thermal energy to the molding machine by making fine adjustments in real time to the volume of fluid in a manner that compensates for the lack of precision in temperature control, that is the essence of the invention.

In one aspect the invention replaces a conventional constant speed motor/centrifugal pump arrangement with a digital electronic servo stepping motor and a positive displacement pump in a conventional molding temperature controller, commonly called a "circulator". A servo stepping motor does not vary in rotor speed or RPMs (rotations per minute) as the supply line voltage fluctuates as a conventional motor driven pump does because in a servo motor, rotor speed is independent of variations in line voltage. The positive displacement pump meters exact quantities of coolant in proportion to the programmed and controlled speed of the motor. A circulator in accordance with the invention is used to control the temperature of a mold, die or injection barrel by controlling the flow rate of the thermal transfer fluid (cooling or heating fluid) to the mold.

The loop or circular routing of heated or cooled fluid that is plumbed from the circulator pump to the mold, die or injection barrel and back is defined as the "control loop." The terms: coolant, cooling fluid, heating fluid, thermal transfer fluid, temperature control fluid, cooling water, oil, and water are used interchangeably herein to refer to control loop fluid with respect to fluid circulators used for temperature control of molding machines and molding processes; except where the context limits the term to only one of heating or cooling fluid, or expressly describes or clearly relates to something other than the control loop fluid.

It is a goal of the invention to provide a more energy efficient circulator by eliminating the slippage losses encountered in a centrifugal pump. It is well known within centrifugal pump manufacturing companies that centrifugal pumps add heat to the pumped media in the form of viscous heat dissipation caused by churning the liquid when the fluid is spun out centrifugally of the pump. In a positive displacement pump there is no slippage as with a centrifugal pump because these pumps use positive displacement gears, rotors or pistons to move the flow. The slippage in a centrifugal pump requires a larger pump and motor to be used to get the same volumetric throughput. A circulator in accordance with the invention can use a smaller, more efficient servo motor to achieve the same volumetric output.

Further, the additional heat imparted to the cooling media by a centrifugal pump has to be removed by a central chilling system, adding a further waste, cost or inefficiency to conventional systems. It is a goal of the invention to reduce or eliminate this source of inefficiency and consume less power to achieve the required flow rate.

In one aspect, a circulator of the invention can be set up to operate at low energy consumption metering of coolant using the central chiller pumping system for energy force. The servo motor just adds what is required to regulate the flow. The positive displacement pump does not churn the coolant and thereby generate heat which must be removed. A smaller servo positive displacement pump may be installed for the same effective pumping rate. Because a circulator in accordance with the invention is not imparting work-heat to the fluid, the central chilling system can be smaller and more energy efficient.

A circulator according to the invention allows for programming behavior that is not possible with a conventional, constant speed motor/centrifugal pump arrangement. When an electronic, servo motor driven, positive-displacement pump is controlling the fluid flow based on rotational position, desirable profiles of flow or flow rate versus time can be generated and adjusted in real time based on sensor data to control the mold, die or injection barrel temperature. In conventional circulators, supply and return line pressure variations and voltage supply line variations are not compensated for and these fluctuations can cause change in volumetric throughput. The result is that even if the coolant loop temperature is held precisely constant at the sensor location, the rate of cooling flow in the mold may be much different. According to the method of the invention, the circulator by means of its electronic, servo motor driven, positive-displacement pump is able to precisely meter the coolant to the mold, die or injection barrel, thereby providing an improved method of temperature control for molding processes.

Circulators of the invention may use conventional direct injection or heat exchanger (closed loop) or other techniques to add or remove heat from the control loop of fluid being directed to the mold. In one aspect, a small quantity of cooled fluid may be added to the control loop during every operating cycle of the injection molding machine. Same cycle direct injection puts into the system a quantity of heat energy at the correct temperature for every cycle of the molding machine; the quantity being selected to match the heat output or thermal load that needs to be removed each cycle from the molding process. It may do this by receiving a simple triggered signal from the molding machine indicating the start each cycle, and inserting a predetermined volume calculated to remove the correct amount of heat, for example. The quantities of fluid injected can vary from minimal to continuous, but always in a per cycle application method.

The return line temperature can also be monitored for temperature rise and the prescribed quantity can be adjusted to maintain control loop temperature in processes that vary in timing or in thermal output. In the direct injection method, when a valve opens to allow a quantity of cooler fluid into the loop, the loop is subjected to upstream delivery pressure variations and downstream return line pressure fluctuations. In this moment, using a prior art circulator, the loop is subject to all the variations upstream and downstream that a conventional centrifugal pump system causes, due to the slippage in the centrifugal pump. Circulators in accordance with the invention, having positive displacement pumps and servo controlled speed, place the necessary braking or boosting of fluid flow needed to assure a constant loop of coolant flow.

With a conventional centrifugal pump/motor circulator the technique used to control the mold, die, or injection barrel is to deliver a temperature controlled flow of fluid and the control means is the setting of this target fluid media temperature. In another means of conventional control using pulsed tempering with a solenoid valve, the mold, die, or injection barrel is controlled in an on-off means where the number and length of the on-off, valve switching pulses determine the rate of cooling control. In distinction, circulators in accordance with the invention, using a an electronic, servo controlled, positive displacement pump and appropriate sensors and controls, provide the ability to control the mold, die, or injection barrel temperature with a much more precisely calibrated delivery of thermal transfer fluid, the profile of fluid flow volume or rate versus time being adjustable to match the real time or actual thermal profile of the process; cycle by cycle.

In other words, in accordance with the invention, a fluid flow rate curve can be programmed and controlled to deliver heated or cooled fluid media in a volumetric flow/time curve or profile that is matched to the molding machine's thermal response to the process, and is essentially independent of other variables in the supply and return line flows. For example, a circulator of the invention can be operated in such a way as to deliver boosted or retarded on-off (pump generated) pulses in ways which conventional solenoid valves cannot. There may be generated a flat volumetric curve in either a flow boosted or flow retarded means.

In another aspect of the invention, the controlled flow rate and temperature of the supplied fluid media can be used to calculate and meter a defined BTU (British Thermal Units) or heat energy quantity delivered per cycle to the mold, die or injection barrel. The quantity and delivery profile can be pre-calculated for startup, and be further adjusted in real time using appropriate sensors on the machine and/or in the control loop.

With the ability to tailor a flow delivery profile, the curve can be adjusted, for example, to be delivered with a high or low peak at any point in the molding cycle. Using a sensor in the mold wall, die wall or injection barrel wall a time/temperature curve can be generated that will reflect the mold cavity temperature each cycle of the molding machine. This time/temperature curve at the wall is then converted into a time/BTU delivery curve tailored to the cooling or heating requirements of the process. The delivery profile can be advanced in time ahead of the peak machine temperature or general machine temperature profile to account for the time lag required to accomplish the higher thermal transfer from machine to fluid for optimal control.

In another aspect of the invention, computer programs and algorithms are readily available that can be used to monitor the control inputs, fluid delivery profiles and measured machine responses in order to "learn" the unique thermal profile of a given machine and process and the most effective control loop fluid delivery profile. Comprehensive review of such data will facilitate machine design analysis, identify problem areas, and suggest alternations and improved designs.

In a further aspect, a method of the invention of delivering a specific, pre-calculated BTU quantity per cycle to the molding system in a programmed rate profile or curve allows the circulator to deliver specific BTU quantities per cycle to the molding system without the use of temperature sensors in the control loop or in the wall of the machine. Neither the conventional pulsed tempering nor the conventional fixed speed centrifugal pump circulator methods can be used in this manner.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One embodiment of the present invention provides a servo stepping motor operating a positive displacement thermal control fluid pump as part of an injection molding temperature control system, commonly called a "circulator" or circulator system. A servo stepping motor is somewhat tolerant of supply line voltage fluctuations that will vary the speed of a conventional motor. The positive displacement pump meters exact quantities of thermal control fluid or coolant in proportion to controlled revolutions of the stepping motor. This circulator system is used to control the temperature of a mold, die or injection barrel by circulating a fluid medium, at a suitably lower or higher temperature depending on whether the process is exothermic or endothermic, through a network of channels in the mold in the conventional manner, adding or extracting heat from the mold. The loop of pre-heated or pre-cooled fluid that is plumbed from the circulator pump to the mold, die or injection barrel is defined as the "control loop." The return flow of the thermal fluid control loop is then reconditioned to the desired fluid temperature, typically by direct injection or heat exchanger methods as described in the background section.

Figure 1A:
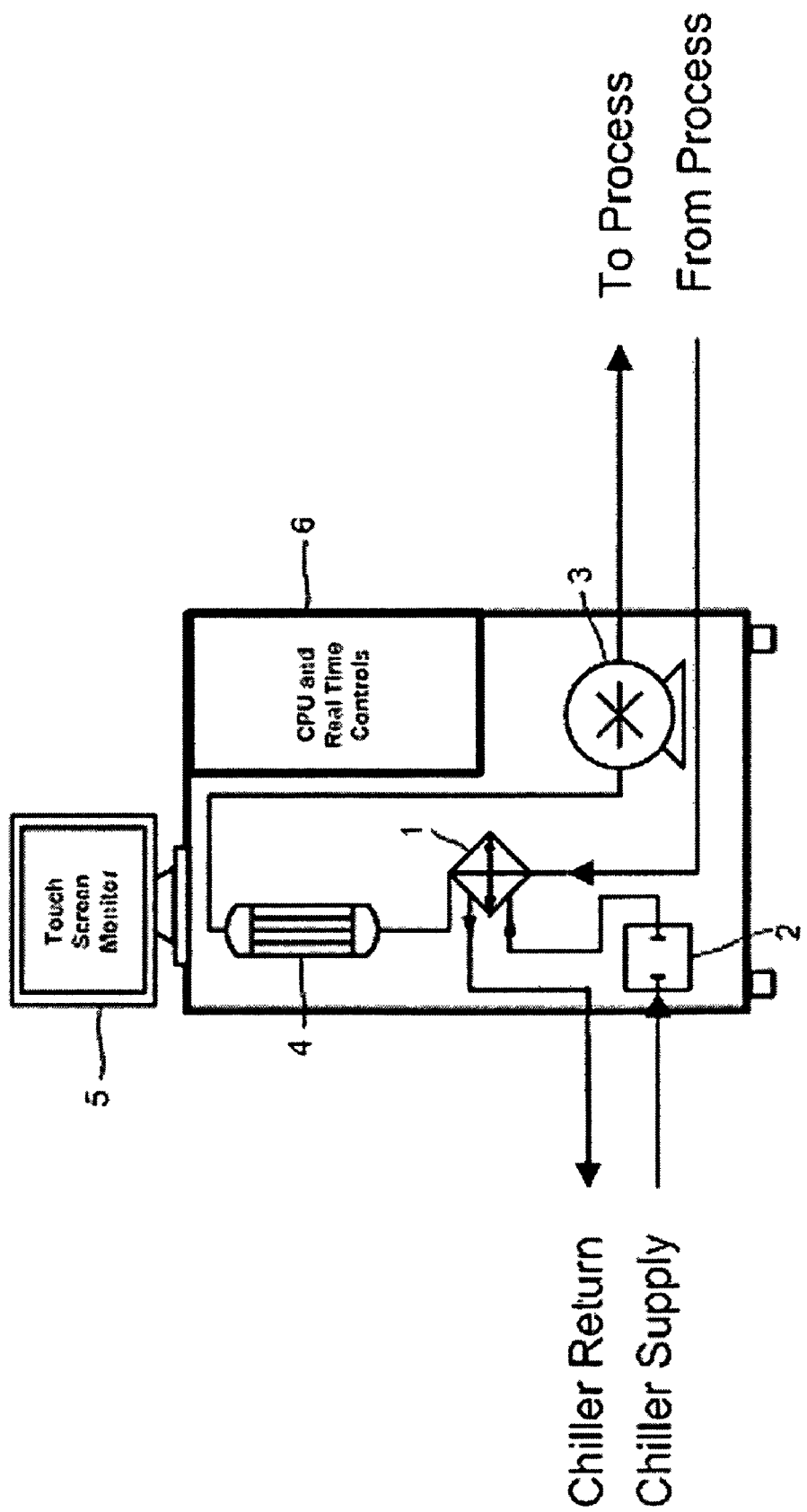
FIG. 1A is a block diagram illustrating a closed loop circulator system configured in accordance with one embodiment of the present invention.
Figure 1B:
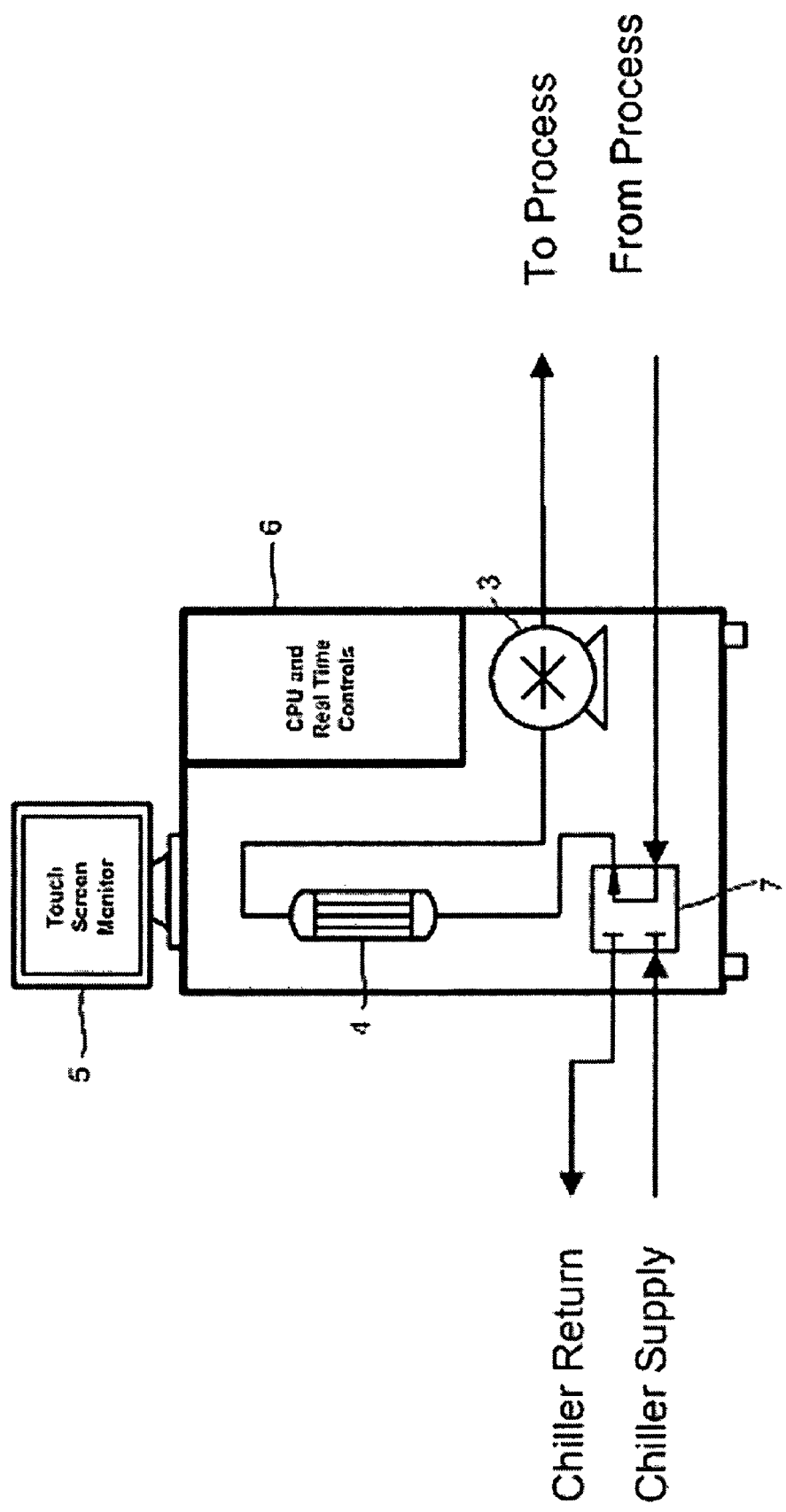
FIG. 1B is a block diagram illustrating a direct injection circulator system configured in accordance with one embodiment of the present invention.

Referring now to FIGS. 1A, 1B, 2 and 3, for convenience all figures use the same reference numbers for the same or analogous components. FIGS. 1A and 1B represent two embodiments of the invention, the two most common circulator techniques, altered in the manner of the invention. FIG. 1A represents a closed loop circulator according to the invention. In this embodiment the cooling/heating fluid medium is circulated via a pump/motor configuration in a closed system where excess heat is removed (or added) using a heat exchanger. FIG. 1B illustrates a direct injection circulator system according to the invention, where make-up fluid at a suitable temperature is injected into the loop while heated fluid is taken out simultaneously.

Figure 2:
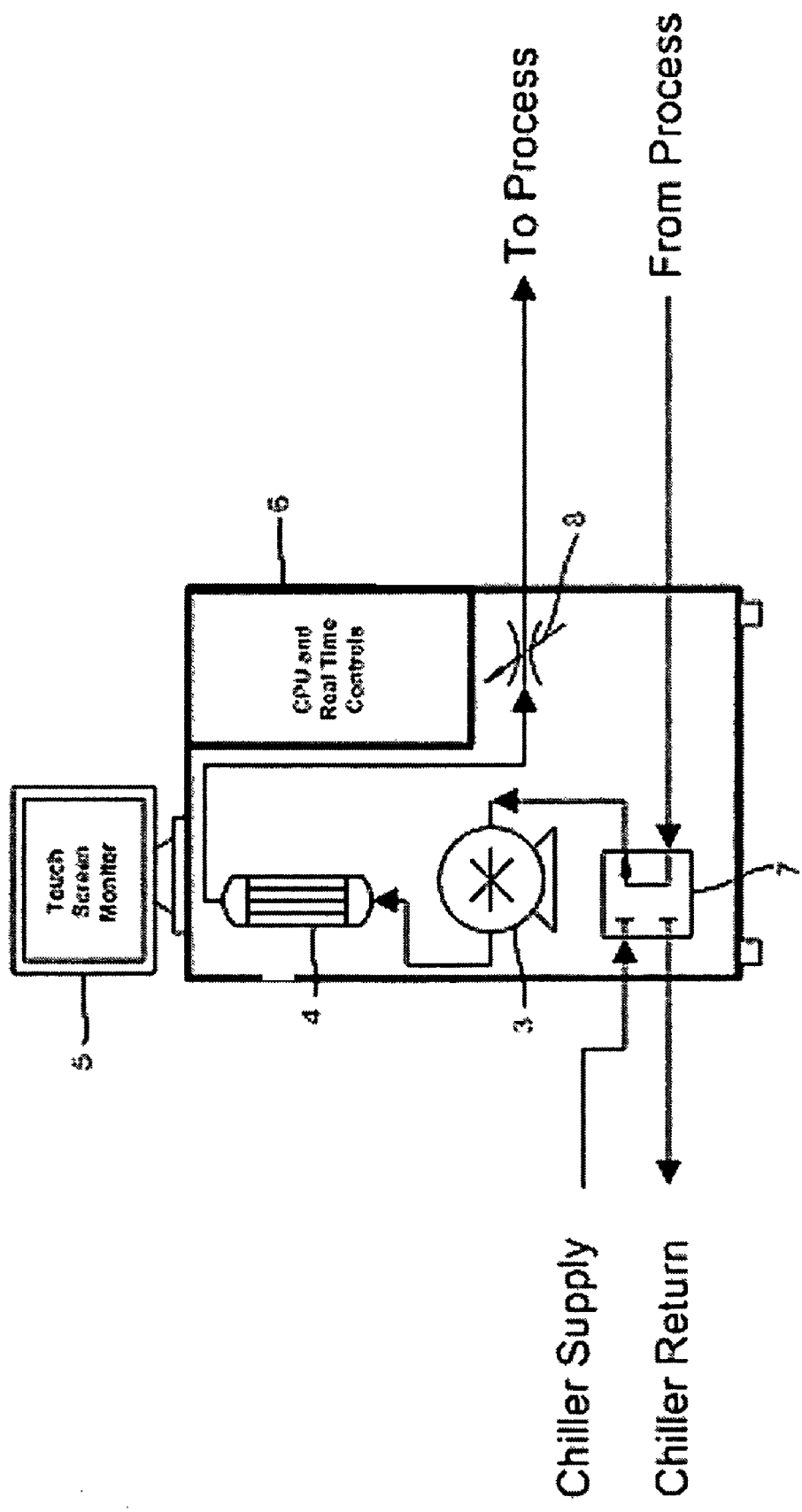
FIG. 2 is a block diagram illustrating a negative pressure direct injection circulator system configured in accordance with one embodiment of the present invention.
Figure 3:
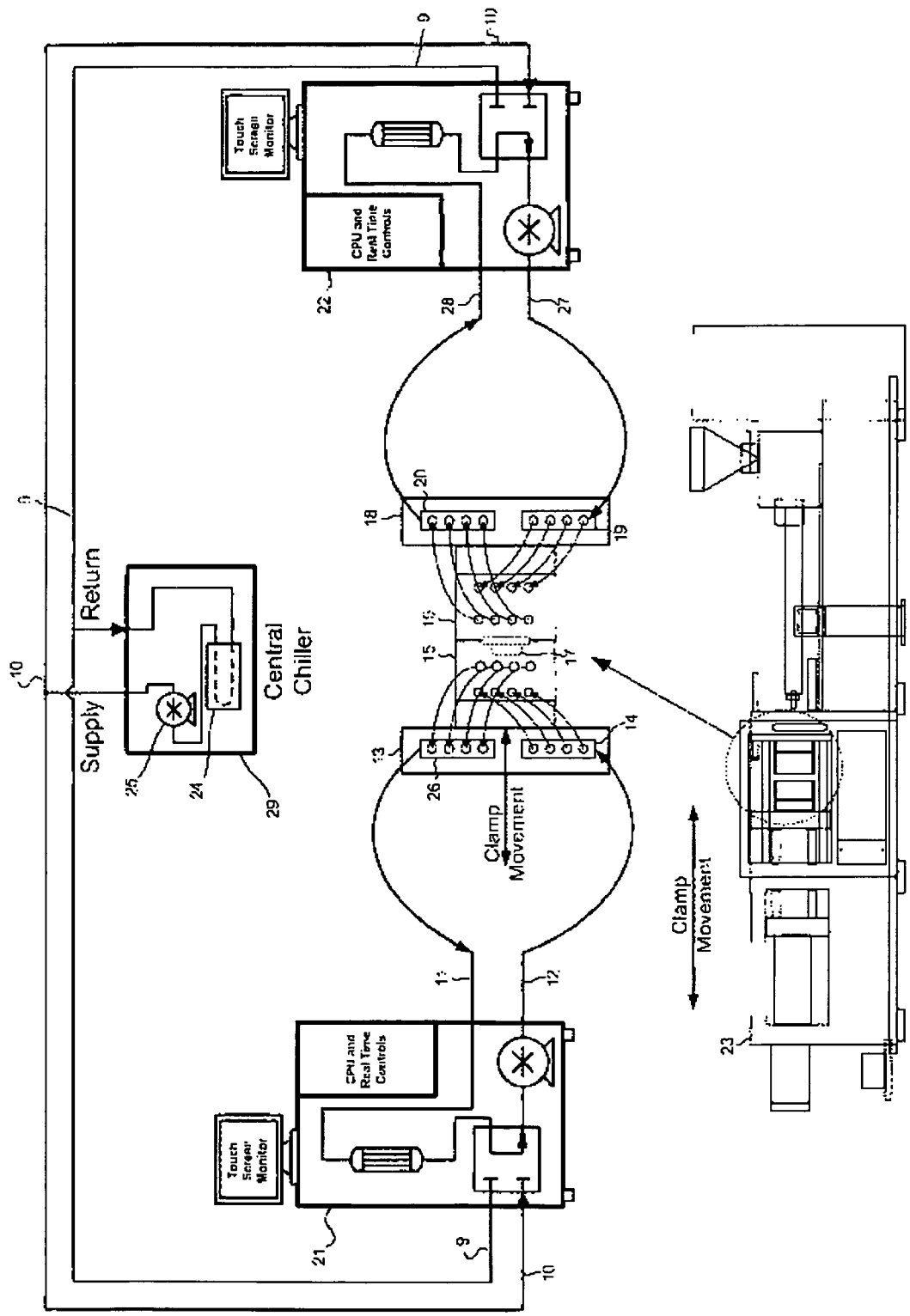
FIG. 3 is a block diagram illustrating a molding system incorporating a circulator system for the control of mold temperature, configured in accordance with one embodiment of the present invention.

FIG. 2 is a representation of a negative pressure circulator embodiment of the invention. FIG. 3 is a drawing showing a typical molding machine and how one embodiment of circulators of the invention are configured with or plumbed into the mold.

Referring again to FIG. 1A, a fluid loop consists of a liquid to liquid heat exchanger 1, connected via an on/off chiller circuit valve 2 to a chiller loop and system configured to meter coolant to the heat exchanger. A servo stepping motor operated, positive displacement pump 3 provides positive flow control to the fluid loop. There is also shown in the fluid loop a fluid heating unit 4, which is common to most circulator system designs. A touch screen human-machine interface 5 (HMI) is connected to CPU and servo control assembly 6 for real time control of pump 3.

Referring now to FIG. 1B, this embodiment is similar to FIG. 1A, including in particular the servo stepping motor operated fixed displacement pump 3 which provides positive flow control to the fluid loop, and the touch screen human-machine interface 5 (HMI) connected to CPU and servo control assembly 6 for real time control of pump 3. However, in this direct injection embodiment, heat exchanger 1 is absent and valve 2 replaced by direct injection valve 7 which is connected to a chiller circuit for thermally reconditioning the make-up supply of fluid.

Referring to FIG. 2, a negative pressure embodiment of the invention is a variation on the embodiment of FIG. 1B except that pump 3 places the mold side of the fluid loop at a negative pressure (with respect to ambient pressure), against the flow resistance offered by inline variable restrictor valve 8.

Referring to FIG. 3, one embodiment of the invention is a molding operation consisting of an injection molding machine 23. Within the machine is a part cavity 17, defined by moving mold half 15 and stationary mold half 16 when they are brought together by moving platen 13 against stationary platen 18. Platens 13 and 18 are configured with supply and return fluid manifolds 14 and 26, and 19 and 20 respectively, for temperature control.

The machine's cooling requirements are serviced by a moving side circulator 21 and a stationary side circulator 22, each of which is configured as the embodiment of FIG. 1B with a servo stepping motor operated fixed displacement pump which provides positive flow control to the fluid loop, and a touch screen human-machine interface (HMI) connected to a CPU and servo control assembly for real time control of the pump. Circulators 21 and 22 are each being serviced for make-up fluid by central chiller 29 via return and supply lines 9 and 10. Central chiller 29 consists of servo'd, fixed displacement pump 24 and refrigeration unit 25.

Figure 4:
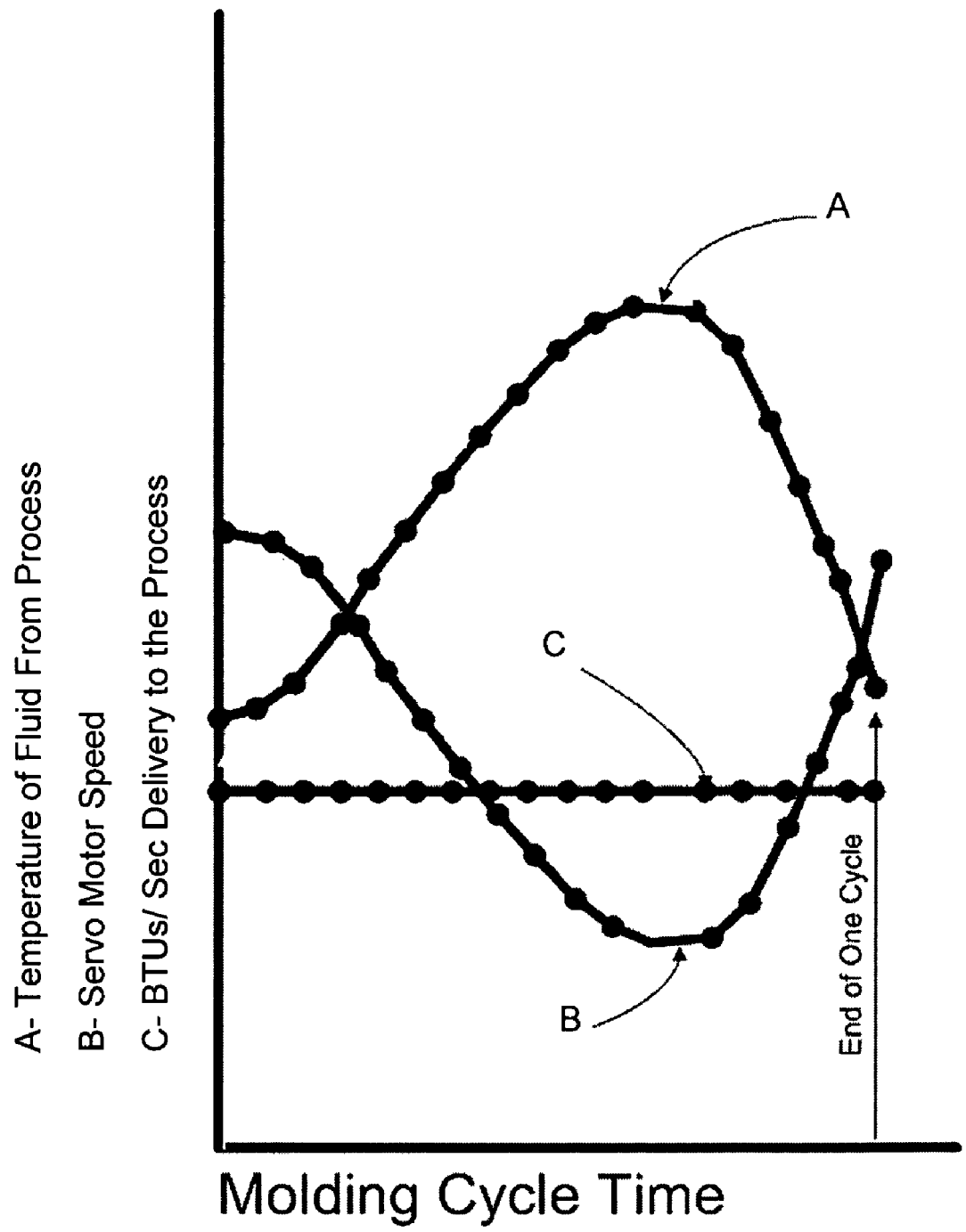
FIG. 4 is an overlay of curves of process temperature, motor speed response, and resulting heat energy being admitted to the control loop during a molding cycle in one embodiment of the invention.

Referring now to FIG. 4, in one embodiment of the invention, the flow rate and temperature of the supplied fluid media can be controlled by a circulator of the invention, without the use of sensors on the machine, to meter the heating fluid injection or heat transfer to the control loop, and fluid flow in the control loop such that a selected heat energy or BTU (British Thermal Unit) level and quantity is delivered over the course of each cycle of operation to the mold, die or injection barrel. For example, in FIG. 4, curve A is the temperature of the return line fluid as measured at the circulator just ahead of the injection or heat exchanger, shown here over the period or time of one molding cycle. Temperature curve A characterizes the total machine response to the process and the control loop fluid heating or cooling, on a continuous basis. The electronic step motors of the circulator in this embodiment are programmed to react to curve A with a motor speed profile, curve B, which directly represents the control loop fluid flow supplied by the fixed displacement pump of the circulator. The sum of the two curves represents the level of heat energy being supplied to the control loop and hence to the machine by the control loop fluid, as is illustrated by curve C.

The quantity and delivery profile can be pre-calculated for startup, and be further adjusted in real time using appropriate sensors in either line of the control loop or on the machine itself. With the ability to tailor a flow delivery profile, the curve can be adjusted, for example, to be delivered with a high or low peak at any point in the molding cycle. Using a sensor in the mold wall, die wall or injection barrel wall, a time/temperature curve can be generated that will reflect the mold cavity temperature for a cycle of the molding machine. This time/temperature curve at the wall may then be matched to the heat energy output or BTU/second delivery curve and a programmed curve for motor speed can be derived. This temperature control process can be conducted in a dynamic, ongoing basis, with feedback from one cycle affecting the control loop flow rate for the same or the next cycle and so on. The delivery profile may need and can be advanced in time ahead of the peak machine temperature or general machine temperature profile to account, for example, for the time lag required to accomplish the thermal transfer from machine to fluid or for the time required for fluid flow to reach the circulator or the return line temperature sensor.

In another aspect of the invention, computer programs and algorithms are readily available that can be used to monitor the control inputs, fluid delivery profiles and measured machine responses in order to "learn" the unique thermal profile of a given machine and process, and create the most effective control loop fluid delivery profile. Collection and review of such data will facilitate machine design analysis, identify problem areas, and suggest alternations and improved mold machine designs.

A servomotor driven fixed displacement pump according to one embodiment of the invention is mounted in a multiplicity of devices such as a circulator device, a small portable chiller, a central large chilling system feeding multiple machines, mounted in a central large evaporative cooling unit feeding multiple machines, a portable tower evaporative cooling unit, or in some embodiments just driving fluid for the purpose of controlling the rate of fluid flow though the mold, die or injection barrel channels, thereby providing means for more precise control of the process and mold temperature throughout each process cycle and the dwell time between cycles as well.

Dynamic control of speed of the servo motor controls the output of the fixed displacement pump and in turn provides dynamic control of the flow rate of the coolant through the mold, die or injection barrel channels during the process.

The additional cooling or heating required to control the temperature of the mold, die or injection barrel and/or the loop of fluid from the circulator to the mold, die or injection barrel may be handled by either "direction injection" or "closed loop" techniques or such other techniques as are susceptible of improvement in accordance with the invention. In its more basic embodiments there may be no heating or cooling sensing or control provision or requirement, but simply a requirement for precise control or dynamic metering of flow rate, as in the case where an oversupply of cooling capacity and a process only requires a repetitive ebb and flow of fluid at a desired rate/time characteristic or curve.

In one embodiment, a personal computer (PC) running an operating system such as Windows, Linux, Unix, or any other operating system may be used as a human machine interface (HMI) to the real time controls. The HMI is used to display multimedia content for the benefit of help screens.

The HMI is networked and is used to display any kind of documentation using custom or commercially available programs such as Word, Excel, PowerPoint, Video, Audio, or CAD, and associated files stored locally or accessed via a networked server. The HMI may be used to link to remote WANs (Wide Area Networks) for remote monitoring, reporting, control inputs, diagnosis and debugging via the internet. The HMI computer may be used to send process data via protocols such as but not limited to OPC (Object Linking and Embedding for Process Control) to a separate molding system SPC/SQC (Statistical Process Control/Statistical Quality Control) controller. The HMI computer may be used to remotely diagnose and debug the controller over a LAN or WAN. In other embodiments, a pump servo controller may be operated via real time controls and may operate the system independent of an on-line HMI connection.

In one circulator embodiment the stepping motor driven, positive displacement pump operates at a constant or variable speed in an in-line configuration and simply meters the flow to the mold, die, or injection barrel. In another circulator embodiment this pump operates at a constant or variable speed as programmed but with the addition of a control loop return line fluid temperature sensor feeding back temperature data to a real time controller which varies the temperature of loop of temperature control fluid going to and from the mold by adding heat with a conventional in-line heater or removing heat via direct injection or a fluid to fluid heat exchanger.

In another circulator embodiment the controller gets a signal from the molding machine that indicates a "cycle-start", the moment when each new cycle commences. This information may be used alone or in combination with other process data for temperature control. Other embodiments may use real time data on any or all of various system variables including temperature, pressure, flow rate, valve position, cycle-start, cycle-end, and various fault signals, in the dynamic control of the loop fluid temperature and/or the mold process temperature.

In yet another circulator embodiment, the controller may receive data from a temperature sensor or other type sensor in the mold so that the control of the mold, die or injection barrel steel temperature is maintained and the real time controller continuously adjusts the rate of flow to control this set point independent of cycle time.

In still another circulator embodiment the thermal control fluid is drawn through the mold, die or injection barrel against the resistance of an in-line restrictor on the supply side of the mold, creating a lower-than-ambient pressure that inhibits fluid leakage from the mold channels.

In an additional circulator embodiment there may be a cycle timing signal consisting of at least one fixed time marker per cycle, such as cycle-start or other identifiable time-based event in the process cycle, supplied from the molding machine and used to run a control loop affecting mold or process temperature by triggering or synchronizing the delivery of repetitive cycles of fluid media in the control loop at a pre-programmed flow rate versus time. For example, over the time period of one molding cycle and one dwell period, the flow rate may ramp up with cycle start, peak in advance of maximum process thermal activity so as to generate a suitably timed temperature differential and thermal transfer rate to control peak temperature, returning to a minimum level for post cycle/dwell period thermal maintenance of the mold.

Further thereto, and in other embodiments, while a cycle-start or other related cycle timing signal triggers or synchronizes cyclic emissions of fluid flow in a control loop according to a pre-programmed fluid flow/time profile or pattern resembling the temperature control requirements of the molding process and the mold configuration, the pre-programmed flow rate may be adjusted in real time or near real time, or periodically as a second order variable, based on sensed temperature at a strategic place in the mold or other useful feedback of system or process data, in order to achieve and maintain the desired mold temperature. If the initial flow rate profile was selected properly, adjustments could be expected to be minor, and stable temperature profiles realized. This technique may help cancel or correct for the gradual effects of changing environmental factors or other external or internal thermal variations or heat build up occurring over the course of extended molding operations. The flow rate pattern for the above embodiment and other embodiments may be in the form of a constant rate mode, pulsed mode, variable rate mode, or any combination of these modes.

In one embodiment, the control loop flow rate may exceed the flow capacity of a fluid supply source when a pump in a circulator according to the invention boosts loop pressure above the pressure of the fluid supply. In another embodiment a pump in a circulator according to the invention may by programmed to create flow rate profiles that boost loop pressure for short durations in order to match cooling curves to plastic injection heating curves. In yet another embodiment, flow rate profiles may be used that vary between full stop or no flow, and a maximum system fluid flow, during the injection cycle or spanning multiple cycles.

In all the above embodiments the invention can create variable flow rates that can be a linear ramp or follow a changing flow rate curve during the injection cycle or spanning multiple cycles. Likewise, flow rates may be continuous or intermittent (pulsed on/off) by a circulator of the invention during the injection cycle or spanning multiple cycles.

According to one embodiment, fluid flow cycles can be can be phased to initiate at any time before, during or after the start of a new injection molding cycle. Further, in this and other embodiments, the fluid flow may be precisely accelerated and decelerated to minimize damaging water hammer effects in the fluid circulation loop.

Another circulator embodiment may be configured to monitor one or more of pressure, temperature, flow or other control loop, system or process variables, and be calibrated for normal operating conditions in any given mold cooling/heating layout so as to detect a changed variable indicating a catastrophic open or closed line or other system or process failure; allowing affected systems to be safely shut down.

The exemplary embodiments and variations described and illustrated above, while not exhaustive of the scope of the invention, can be described alternatively. For example, one embodiment may be described as a fluid circulator system for regulating the temperature of a molding machine, where a fluid control loop has a fluid supply line and a fluid return line plumbed to a respective fluid supply manifold and fluid return manifold on said injection molding machine. A fixed displacement pump is disposed in the control loop by which a temperature control fluid is volumetrically advanced from the fluid return line into the fluid supply line. There is a servo motor by which the fixed displacement pump is driven, and a control system by which the servo motor is controlled.

The control system may be a computer-based control system. There may be a fluid temperature sensor connected to the control system and associated with the manner in which the motor is controlled. There may be means for changing the temperature of the temperature control fluid.

The fluid circulator system being a closed loop type circulator. There may be a heat exchanger for changing the temperature of the temperature control fluid; where one side of the heat exchanger is disposed in the control loop, and the other side is connected to a chiller system.

The fluid circulator system may be a direct injection type circulator. There may be a direct injection valve disposed in the control loop and connected to a source of thermally conditioned make-up fluid for changing the temperature of the temperature control fluid. There may be an in-line heater disposed in the control loop in some embodiments. The servo motor may be an electronic servo motor in some embodiments.

Another embodiment of the invention may be described as a fluid medium temperature control system for use in molding operations, consisting of a fixed displacement pump disposed in a fluid circulation loop whereby a temperature control fluid is volumetrically advanced in the circulation loop. The circulation loop is configured with respect to a molding machine, which configuration may be direct plumbing connections to the molding machine or being indirectly connected as through a direct injection type or closed loop type circulator system or other intermediate cooling system connected to the molding machine, for transferring thermal energy between the temperature control fluid and the molding machine such that the temperature of the temperature control fluid is changed from a first temperature to a second temperature which may be higher or lower.

There is a servo motor by which the fixed displacement pump is driven. There is a means for restoring the temperature of the temperature control fluid from the second temperature to the first temperature. There is also a control system by which the servo motor is controlled, in order to control the volume of temperature control fluid being inserted into the temperature control process.

There may be an evaporative cooling unit for restoring the temperature of the fluid from the second temperature to the first temperature. There may be a chiller for restoring the temperature of the fluid from the second temperature to the first temperature. The control system may be a computer-based control system. There may be one or more fluid temperature sensors connected to the control system.

The invention also contemplates methods. For example there is a method for controlling the temperature of a molding machine, consisting of advancing a controlled volume of a temperature control fluid at a first temperature in a temperature control loop by means of a fixed displacement pump driven by a servo motor, where the control loop is configured with respect to the molding machine, directly or indirectly, for transferring thermal energy between the temperature control fluid and the molding machine based on the difference in the first temperature and the temperature of the molding machine, thereby changing the first temperature of the temperature control fluid to a second temperature, which may be higher or lower.

There may be a restoring of the thermal energy level of the temperature control fluid such that the second temperature is restored back to the first temperature. There may be a calculating of the controlled volume based on the second temperature. There may be a monitoring of the second temperature, and an advancing of the controlled volume at a rate calculated from the second temperature in order to maintain a constant thermal energy level in the molding machine.

There may also be a displaying in real time on an operator interface of the rate of the advancing of the temperature control fluid. There may be a displaying in real time on an operator interface of the first and/or the second temperature.

There may be a displaying in real time on an operator interface of the rate of delivery of thermal energy from the molding machine to the control loop or vice versa.

The foregoing description of the embodiments of the invention has been presented for the purposes of illustration and description. It is not intended to be exhaustive or to limit the invention to the precise form disclosed. Many modifications and variations are possible in light of this disclosure.

What is claimed is:

1. A method of controlling a thermal exchange liquid as it is circulated through an injection mold, die, or barrel (herein referred to as a "process"), the method comprising:
    establishing an energy set point, the energy set point being a desired rate of thermal energy exchange with the process;
    circulating the thermal exchange liquid through the process at a selected flow rate using a positive displacement pump coupled to a motor having a programmable and controllable speed which is independent of variations in line voltage;
    sensing an actual process inlet temperature and an actual process outlet temperature for the thermal exchange liquid;
    determining an actual flow rate of the thermal exchange liquid;
    computing an actual rate of thermal energy exchange between the thermal exchange liquid and the process according to the actual inlet and outlet temperatures and the actual flow rate; and
    computing and making an adjustment to the selected flow rate so as to correct the actual rate of thermal energy exchange to the energy set point.

2. The method of claim 1, wherein determining the actual flow rate of the thermal exchange liquid includes determining a pumping speed of the positive displacement pump.

3. The method of claim 1, wherein correcting the actual rate of thermal energy delivery to the energy set point includes adjusting a time average of the thermal energy exchange rate to be substantially equal to the energy set point.

4. The method of claim 1, wherein correcting the actual rate of thermal energy exchange to the energy set point includes:
    calculating an average thermal energy exchange rate during a first time interval;
    and
    adjusting the flow rate at the beginning of a second time interval so as to cause a net average thermal energy exchange rate over the first time interval and the second time interval to be substantially equal to the energy set point.

5. The method of claim 1, wherein determining an actual thermal energy exchange rate includes:
    measuring an inlet pressure of the thermal exchange liquid; and
    calculating an inlet mass flow rate of the thermal exchange liquid according to the inlet pressure, the fluid flow rate, and known properties of the thermal exchange fluid.

6. The method of claim 1, wherein the energy set point is a constant energy exchange rate.

7. The method of claim 1, wherein the energy set point is a thermal energy exchange rate profile.

8. The method of claim 7, wherein the thermal energy exchange rate profile is calculated so as to maintain a desired temperature versus time profile for the process.

9. The method of claim 1, wherein the thermal exchange liquid is one of water and oil.

10. The method of claim 1, wherein the thermal exchange liquid is continuously delivered to the process inlet.

11. The method of claim 1, wherein the thermal exchange liquid is delivered to the process inlet in pulsed bursts, the flow rate of the thermal exchange liquid being an average flow rate.

12. The method of claim 1, further comprising:
displaying the actual thermal energy exchange rate on a display visible to an operator.

13. A system for controlling a rate of thermal energy exchange between a thermal exchange liquid and a process comprising an injection mold, die, or barrel as the thermal exchange liquid is circulated through the process, the system comprising:
a process comprising a mold, die, or barrel;
a positive displacement pump coupled to a motor having a programmable and controllable speed which is independent of variations in line voltage, the positive displacement pump being in liquid communication with the process and being able to circulate the thermal exchange liquid through the process at a selected flow rate;
a flow rate determining mechanism for determining an actual flow rate of the thermal exchange liquid;
inlet and outlet temperature sensors which are able to determine an actual process inlet temperature and an actual process outlet temperature respectively for the thermal exchange liquid; and
an energy exchange controller which computes an actual rate of thermal energy exchange between the thermal exchange fluid and the process according to the actual process inlet and outlet temperatures and the actual flow rate of the thermal exchange liquid, establishes an energy set point, and computes and makes an adjustment to the selected flow rate so as to correct the actual rate of thermal energy exchange to the energy set point, the energy set point being a desired rate of thermal energy exchange.

14. A method of controlling a thermal exchange liquid as it is circulated through an injection mold, die, or barrel (herein referred to as a "process") comprising:
establishing an energy set point, the energy set point being a desired rate of thermal energy exchange with the process;
circulating the thermal exchange liquid through the process at a selected flow rate using a positive displacement pump coupled to a motor having a programmable and controllable speed which is independent of variations in line voltage;
determining a process inlet temperature set point for the thermal exchange liquid;
controlling an actual process inlet temperature of the thermal exchange liquid so as to minimize its deviation from the process inlet temperature set point;
sensing an actual process inlet temperature and an actual process outlet temperature for the thermal exchange liquid;
determining an actual flow rate of the thermal exchange fluid;
computing an actual rate of thermal energy exchange between the thermal exchange fluid and the process according to the actual inlet and outlet temperatures and the actual flow rate; and
computing and making an adjustment to at least one of the selected flow rate and the process inlet temperature set point so as to correct the actual rate of thermal energy delivery to the energy set point.

* * * * *